United States Patent
DePaoli et al.

(10) Patent No.: US 10,711,690 B2
(45) Date of Patent: Jul. 14, 2020

(54) WASTEGATE ASSEMBLY AND TURBOCHARGER INCLUDING THE SAME

(71) Applicant: BorgWarner Inc., Auburn Hills, MI (US)

(72) Inventors: Dominic William DePaoli, Horse Shoe, NC (US); Matthew Carson Colley, Arden, NC (US)

(73) Assignee: BorgWarner Inc., Auburn Hills, MI (US)

( * ) Notice: Subject to any disclaimer, the term of this patent is extended or adjusted under 35 U.S.C. 154(b) by 0 days.

(21) Appl. No.: 16/181,788

(22) Filed: Nov. 6, 2018

(65) Prior Publication Data

US 2020/0141308 A1    May 7, 2020

(51) Int. Cl.
    *F02B 37/18*    (2006.01)
    *F16K 1/50*    (2006.01)
    *F01D 17/10*    (2006.01)

(52) U.S. Cl.
    CPC .......... *F02B 37/186* (2013.01); *F01D 17/105* (2013.01); *F02B 37/183* (2013.01); *F16K 1/50* (2013.01); *F05D 2220/40* (2013.01); *Y02T 10/144* (2013.01)

(58) Field of Classification Search
    CPC .... F02B 37/186; F02B 37/183; F01D 17/105; F16K 1/50; Y02T 10/144; F05D 2220/40
    USPC ........................................ 60/602, 605.1–612
    See application file for complete search history.

(56) References Cited

U.S. PATENT DOCUMENTS

| 10,233,834 | B2 * | 3/2019 | McGahey | ........... | F04D 27/0238 |
| 2012/0317975 | A1 * | 12/2012 | Schoenherr | ........... | F02B 37/183 |
| | | | | | 60/602 |

| 2014/0193240 | A1 * | 7/2014 | Boehmer | .............. | F02B 37/183 |
| | | | | | 415/116 |
| 2015/0097345 | A1 | 4/2015 | House et al. | | |
| 2017/0145909 | A1 | 5/2017 | Huh | | |

(Continued)

FOREIGN PATENT DOCUMENTS

| DE | 102012224189 A1 | 6/2014 |
| WO | 2014121986 A1 | 8/2014 |

OTHER PUBLICATIONS

Machine-Assisted English language abstract and Machine-Assisted English language translation for DE 10 2012 224 189 extracted from espacenet.com database on Dec. 5, 2018, 42 pages.

(Continued)

*Primary Examiner* — Hoang M Nguyen (74) *Attorney, Agent, or Firm* — Howard & Howard Attorneys PLLC (57) ABSTRACT

A wastegate assembly for a turbocharger includes a valve element having a valve body and a shaft extending away from the valve body. A spindle is coupled to the shaft for moving the valve element between a first and a second position to control the flow of exhaust gas to a turbine housing interior of the turbocharger. A washer is coupled to the shaft such that the spindle is disposed between the valve body and the washer for retaining the spindle to the shaft. A biasing member is disposed between the spindle and the washer, has a trough portion extending toward the spindle, and has a crest portion extending toward the washer. At least one of the spindle and the washer define a seating groove and the biasing member extends at least partially into the seating groove to seat and prevent rotation of the biasing member.

20 Claims, 5 Drawing Sheets

(56) References Cited

U.S. PATENT DOCUMENTS

2017/0145911 A1    5/2017  Takahashi et al.
2018/0094573 A1    4/2018  Schoenherr et al.
2019/0010864 A1*   1/2019  Hoffmann ............... F02B 37/12

OTHER PUBLICATIONS

English language abstract and machine-assisted English translation for WO 2014/121986 extracted from espacenet.com database on Dec. 5, 2018, 13 pages.

* cited by examiner

WASTEGATE ASSEMBLY AND TURBOCHARGER INCLUDING THE SAME

BACKGROUND OF THE INVENTION

1. Field of the Invention

The present invention relates generally to a wastegate assembly for controlling flow of exhaust gas to a turbine housing interior of a turbocharger and, more specifically, a turbocharger including the wastegate assembly.

2. Description of the Related Art

Turbochargers receive exhaust gas from an internal combustion engine and deliver compressed air to the internal combustion engine. Turbochargers are used to increase power output of the internal combustion engine, lower fuel consumption of the internal combustion engine, and reduce emissions produced by the internal combustion engine. Delivery of compressed air to the internal combustion engine by the turbocharger allows the internal combustion engine to be smaller, yet able to develop the same or similar amount of horsepower as larger, naturally aspirated internal combustion engines. Having a smaller internal combustion engine for use in the vehicle reduces the mass and aerodynamic frontal area of the vehicle, which helps reduce fuel consumption of the internal combustion engine and improve fuel economy of the vehicle.

Typical turbochargers include a turbine housing, which includes an interior surface defining a turbine housing interior. The interior surface extends between a turbine housing inlet and a turbine housing outlet. The turbine housing inlet is defined at one end of the interior surface and is in fluid communication with the internal combustion engine and the turbine housing interior for delivering exhaust gas from the internal combustion engine to the turbine housing interior. The turbine housing outlet is defined at an opposite end of the interior surface and is in fluid communication with the turbine housing interior for discharging exhaust gas from the turbine housing interior.

Typical turbine housings also include a wastegate duct disposed downstream of the turbine housing inlet. The wastegate duct defines a wastegate channel in fluid communication with the turbine housing inlet for discharging exhaust gas from the turbine housing inlet by bypassing the turbine housing interior. A valve seat is typically disposed about the wastegate channel at a channel outlet of the wastegate channel.

In many conventional turbochargers, a wastegate assembly is disposed downstream of the turbine housing inlet for controlling flow of exhaust gas from the internal combustion engine and through the wastegate channel. The wastegate assembly includes a valve element engageable with the valve seat. The valve element has a valve body and a shaft extending away from the valve body. The wastegate assembly further includes a spindle coupled to the shaft of the valve element for moving the valve element between a first (i.e., closed) position where the valve body is engaged with the valve seat and the valve element is blocking flow of exhaust gas through the wastegate duct and a second (i.e., open) position where the valve body is disengaged with the valve seat and the valve element allows flow of exhaust gas through the wastegate channel. A washer is typically coupled to the shaft of the valve element and spaced from the spindle such that the spindle is disposed between the valve body and the washer for retaining the spindle to the shaft of the valve element.

During operation of the turbocharger, exhaust gas flows through the wastegate channel and exerts a force on the valve body of the valve element, particularly when the valve element is in the first position. This force causes the wastegate assembly to rattle during operation of the turbocharger, resulting in noise, vibration, and harshness (NVH) issues. Typical wastegate assemblies for turbochargers, therefore, further include a biasing member disposed between the spindle and the washer to attempt to alleviate these NVH issues. However, these biasing members are typically expensive, fragile, and subject to fatigue brought about from stress on the valve body. In particular, the biasing members are subject to high torque during operation of the turbocharger. As such, typical biasing members in wastegate assemblies are subject to wear and to premature failure. Once the biasing members fail, the NVH issues return to the turbocharger.

As such, there remains a need to provide an improved wastegate assembly for a turbocharger.

SUMMARY OF THE INVENTION AND ADVANTAGES

The present invention provides a wastegate assembly that controls flow of exhaust gas to a turbine housing interior of a turbocharger. The wastegate assembly includes a valve element having a valve body and a shaft extending away from the valve body. The shaft extends along an axis between a first end and a second end spaced from the first end along the axis, and the valve element is moveable between a first position and a second position to control the flow of exhaust gas to the turbine housing interior of the turbocharger.

The wastegate assembly further includes a spindle coupled to the shaft of the valve element for moving the valve element between the first and second positions, and a washer coupled to the shaft of the valve element and spaced from the spindle along the axis. As such, the spindle is disposed between the valve body and the washer for retaining the spindle to the shaft of the valve element. The wastegate assembly further includes a biasing member disposed between the spindle and the washer, with the biasing member having a trough portion extending toward the spindle and having a crest portion extending toward the washer.

At least one of the spindle and the washer define a seating groove, and the biasing member extends at least partially into the seating groove to seat and prevent rotation of the biasing member.

Because the biasing member is prevented from rotating when extending at least partially into the seating groove, the biasing member resists deformation as force is applied to the biasing member. Accordingly, the wastegate assembly has increased rotational stiffness, particularly between the biasing member and at least one of the spindle and the washer. This rotational stiffness resists high torque exerted on the wastegate assembly during operation of the turbocharger. More specifically, this rotational stiffness damps motion between the relative components of the wastegate assembly, particularly between the biasing member and at least one of the spindle and the washer. Additionally, the rotational stiffness imparted to the wastegate assembly protects the biasing member from wear, fatigue, and premature failure.

In turn, this extends the life of the wastegate assembly and prevents the undesired NVH issues in the turbocharger.

BRIEF DESCRIPTION OF THE DRAWINGS

Other advantages of the present invention will be readily appreciated, as the same becomes better understood by reference to the following detailed description when considered in connection with the accompanying drawings wherein.

DETAILED DESCRIPTION OF THE INVENTION

Figure 1:
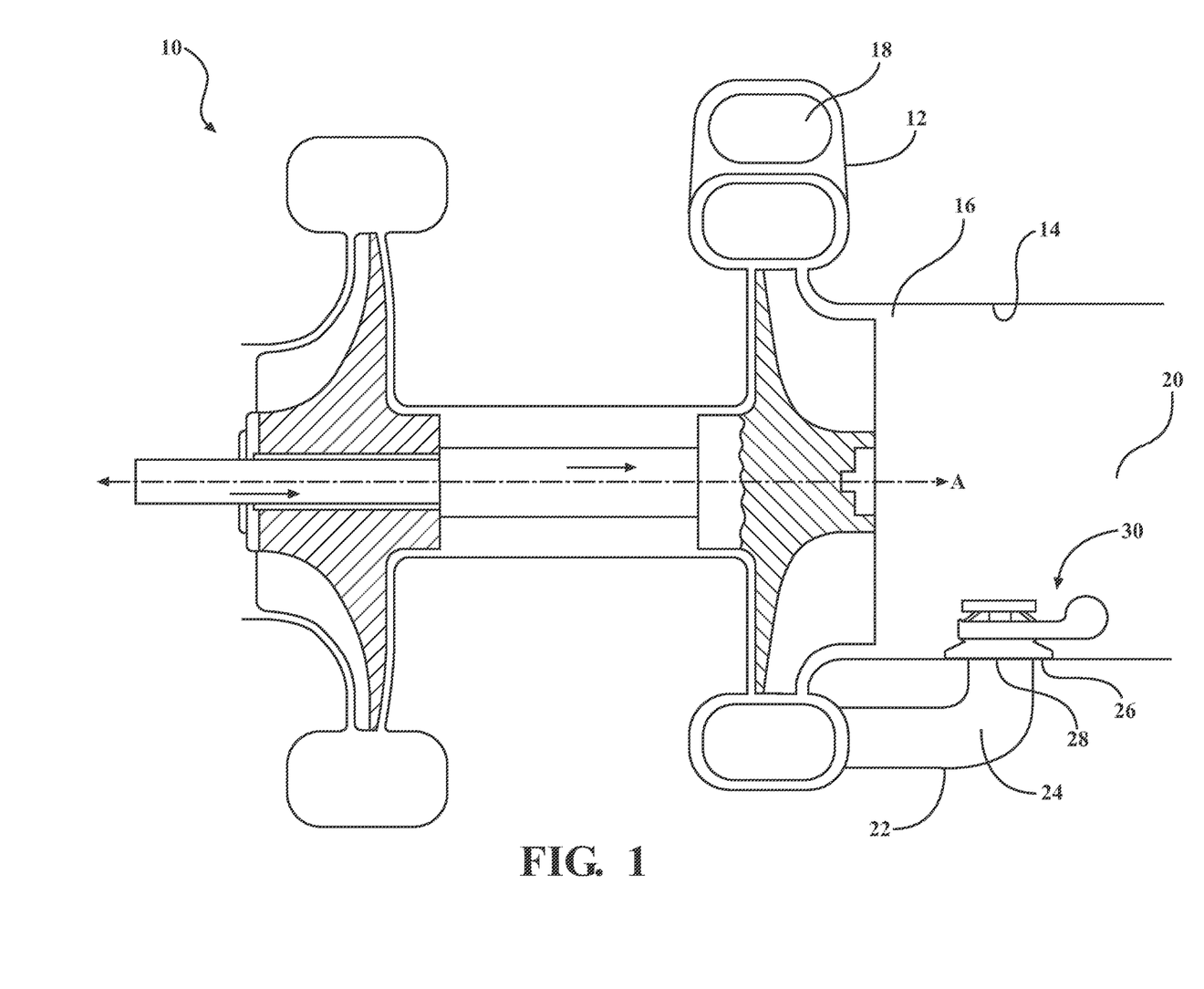
FIG. 1 is a schematic illustration of a turbocharger with a wastegate duct defining a wastegate channel and a wastegate assembly that controls flow of exhaust gas to a turbine housing interior.

With reference to the Figures, wherein like numerals indicate like parts throughout the several views, a turbocharger 10 is shown schematically in FIG. 1. The turbocharger 10 receives exhaust gas from an internal combustion engine and delivers compressed air to the internal combustion engine. The turbocharger 10 includes a turbine housing 12. The turbine housing 12 includes an interior surface 14 defining a turbine housing interior 16, and the interior surface 14 extends between a turbine housing inlet 18 and a turbine housing outlet 20. The turbine housing inlet 18 is defined at one end of the interior surface 14 and is in fluid communication with the internal combustion engine and the turbine housing interior 16 for delivering exhaust gas from the internal combustion engine to the turbine housing interior 16. The turbine housing outlet 20 is defined at an opposite end of the interior surface 14 and is in fluid communication with the turbine housing interior 16 for discharging exhaust gas from the turbine housing interior 16.

The turbine housing also includes a wastegate duct 22 disposed downstream of the turbine housing inlet 18. The wastegate duct 22 defines a wastegate channel 24 in fluid communication with the turbine housing inlet 18. The wastegate channel 24 discharges exhaust gas from the turbine housing inlet 18 by bypassing the turbine housing interior 16. A valve seat 26 is disposed about the wastegate channel 24 at a channel outlet 28 of the wastegate channel 24.

The turbocharger 10 also includes a wastegate assembly 30 that controls flow of exhaust gas to the turbine housing interior 16. The wastegate assembly 30 includes a valve element 32 engageable with the valve seat 26. The valve element 32 has a valve body 34 and a shaft 36 extending away from the valve body 34. The shaft 36 extends along an axis A between a first end 38 and a second end 40 spaced from the first end 38 along the axis A. The valve element 32 is moveable between a first (i.e., closed) position and a second (i.e., open) position to control the flow of exhaust gas through the wastegate channel 24 of the turbocharger 10. In the first position, the valve body 34 is engaged with the valve seat 26 for preventing flow of exhaust gas from the turbine housing inlet 18 from bypassing the turbine housing interior 16. In the second position, the valve body 34 is disengaged with the valve seat 26 for allowing flow of exhaust gas from the turbine housing inlet 18 to bypass the turbine housing interior 16.

Figure 2A:
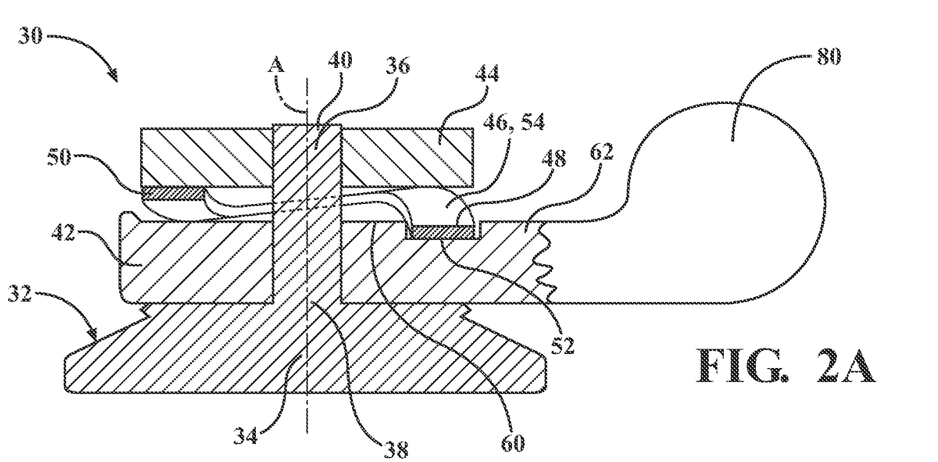
FIG. 2A is a cross-sectional view of the wastegate assembly having a valve element, with the valve element having a valve body, a shaft extending away from the valve body, a spindle coupled to the shaft, a washer coupled to the shaft, and a biasing member disposed between the spindle and the washer, with the spindle defining a seating groove and with a trough portion of the biasing member extending at least partially into the seating groove.
Figure 2B:
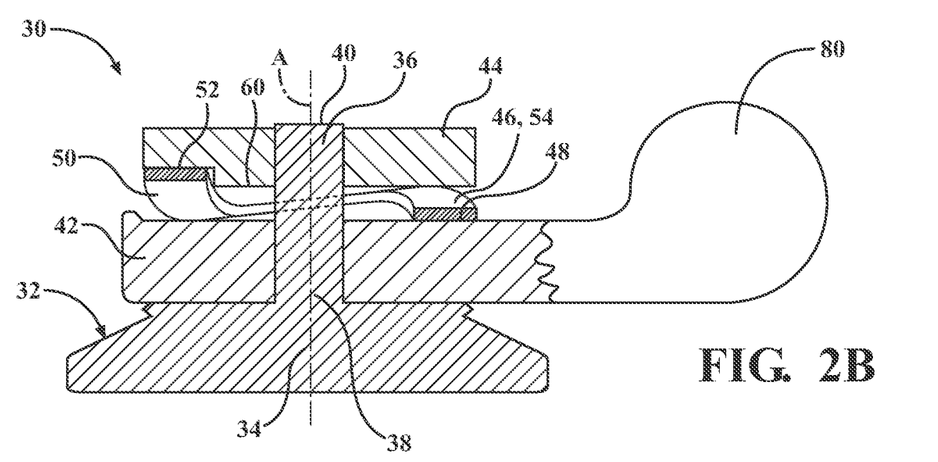
FIG. 2B is a cross-sectional view of the wastegate assembly, with the washer defining the seating groove and with a crest portion of the biasing member extending at least partially into the seating groove.

The wastegate assembly 30 further includes a spindle 42 and a washer 44. The spindle 42 is coupled to the shaft 36 of the valve element 32 for moving the valve element 32 between the first position and the second position. The washer 44 is coupled to the shaft 36 of the valve element 32 and is spaced from the spindle 42 along the axis A such that the spindle 42 is disposed between the valve body 34 and the washer 44 for retaining the spindle 42 to the shaft 36 of the valve element 32. The wastegate assembly 30 further includes a biasing member 46 disposed between the spindle 42 and the washer 44, with the biasing member 46 having a trough portion 48 extending toward the spindle 42 and having a crest portion 50 extending toward the washer 44.

At least one of the spindle 42 and the washer 44 define a seating groove 52 and the biasing member 46 extends at least partially into the seating groove 52 to seat and prevent rotation of the biasing member 46. In other words, the spindle 42 may define the seating groove 52 and the biasing member 46 may extend at least partially into the seating groove 52 to seat and prevent rotation of the biasing member 46, the washer 44 may define the seating groove 52 and the biasing member 46 may extend at least partially into the seating groove 52 to seat and prevent rotation of the biasing member 46, or both the spindle 42 and the washer 44 may define the seating groove 52 and the biasing member 46 may extend at least partially into the seating groove 52 to seat and prevent rotation of the biasing member 46. It is to be appreciated that the biasing member 46 may extend completely into the seating groove 52, or only a portion of the biasing member 46 may extend into the seating groove 52.

Because the biasing member 46 is prevented from rotating when extending at least partially into the seating groove 52, the biasing member 46 resists deformation as force is applied to the biasing member. Accordingly, the wastegate assembly 30 has increased rotational stiffness, particularly between the biasing member 46 and the spindle 42, between the biasing member 46 and the washer 44, or between the biasing member 46 and both the spindle 42 and the washer 44. This rotational stiffness resists high torque exerted on the wastegate assembly 30 during operation of the turbocharger 10. More specifically, this rotational stiffness damps motion between the relative components of the wastegate assembly 30, particularly between the biasing member 46 and the spindle 42, between the biasing member 46 and the washer 44, or between the biasing member 46 and both the spindle 42 and the washer 44. Additionally, the rotational stiffness imparted to the wastegate assembly 30 protects the biasing member 46 from wear, fatigue, and premature failure. In turn, this extends the life of the wastegate assembly 30 and prevents the undesired NVH issues in the turbocharger 10.

In one embodiment, the biasing member 46 is a wave spring 54. In this embodiment, the wave spring 54 may form a closed loop, or may form a partially open loop. The wave spring 54 may have a single turn, or may have multiple turns. Additionally, in the embodiment where the wave spring 54 has multiple turns, the wave spring 54 may be nested to increase the spring rate of the wave spring 54.

The seating groove 52 may be cast into either the spindle 42 or the washer 44. Alternatively, the seating groove 52 may be machined into either the spindle 42 or the washer 44 after the spindle 42 or the washer 44 is cast or otherwise formed.

Figure 5:
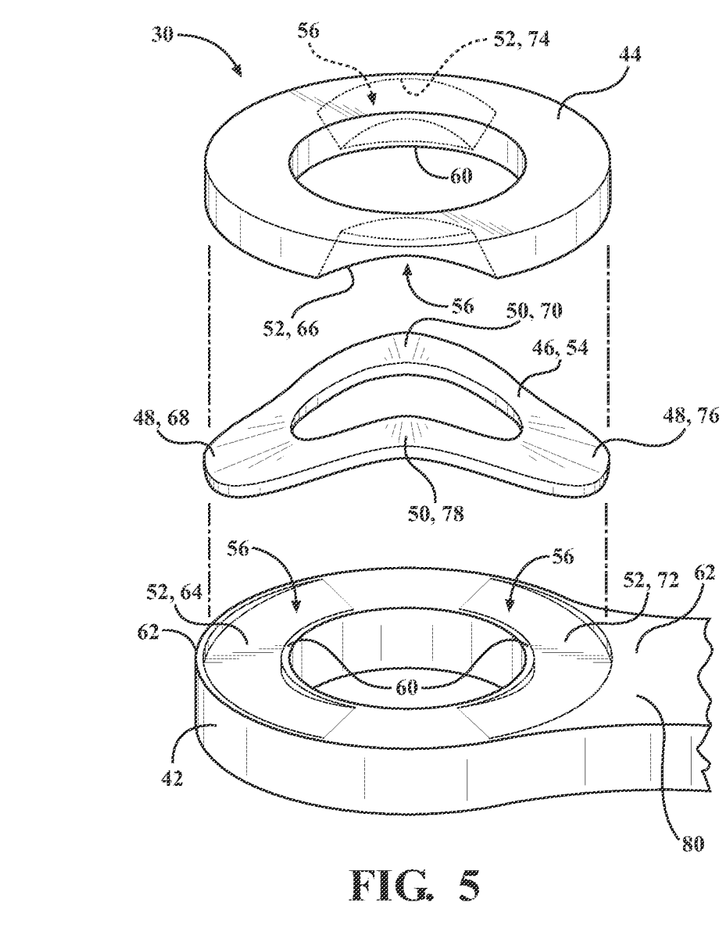
FIG. 5 is a perspective, exploded view of the wastegate assembly, with the seating groove defined in a continuous sinusoidal pattern.

In one embodiment, as shown in FIG. 5, the spindle 42, the washer 44, or both the spindle 42 and the washer 44 define the seating groove 52 in a continuous sinusoidal pattern 56 about the axis A. The continuous sinusoidal pattern 56 may undulate about the axis A approximating the curvature of the trough and crest portions 48, 50 of the biasing member 46. The continuous sinusoidal pattern 56 may be uninterrupted and form a smooth curve completely about the axis A.

Alternatively, the continuously sinusoidal pattern 56 may instead be interrupted, with planar portions forming at least part of the seating groove 52 or with the planar portions disposed between adjacent seating grooves 52 in the spindle 42 or the washer 44, as shown in FIG. 5. In this embodiment, the seating groove 52 transitions into the planar portion without any discontinuities therebetween. The continuously sinusoidal pattern 56 may also approximate an undulating configuration by having a series of planar portions that approximate the curvature of the trough and crest portions 48, 50 of the biasing member. It is to be appreciated that many geometries of the seating groove 52 are possible while still forming a continuous sinusoidal pattern 56 about the axis A.

Figure 6:
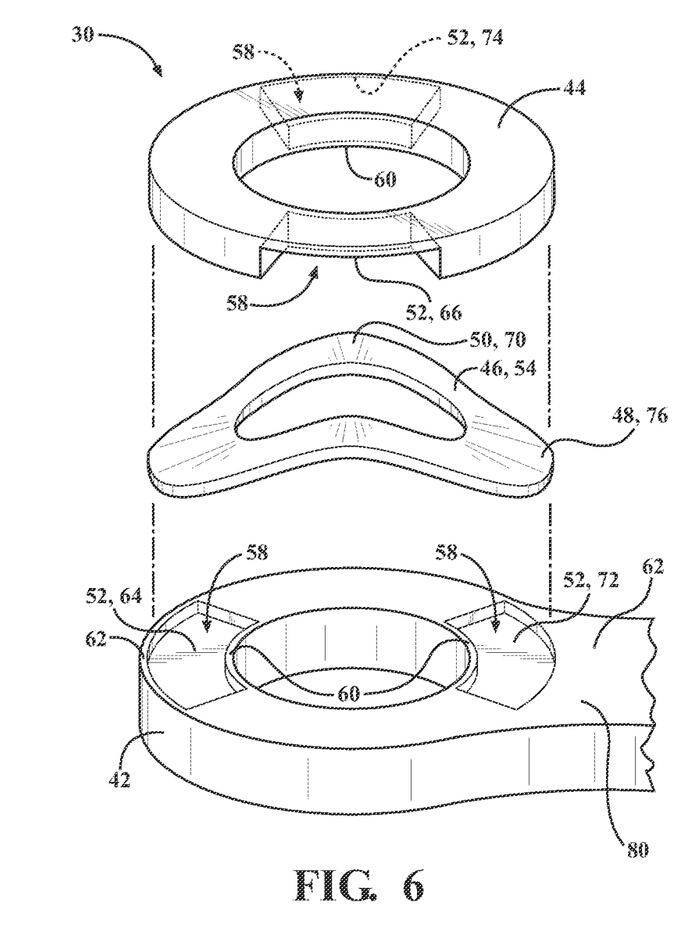
FIG. 6 is a perspective, exploded view of the wastegate assembly, with the seating groove defined in a planar notched pattern.

In another embodiment, as shown in FIG. 6, the spindle 42, the washer 44, or both the spindle 42 and the washer 44 define the seating groove 52 in a planar notched pattern 58 about the axis A. The planar notched pattern 58 may form a series of steps about the axis A. In other words, the steps may be defined into the spindle 42 or the washer 44 at approximately a 90 degree angle relative to the axis A. In this embodiment, a series of rectangular notches are formed and the planar notched pattern 58 is interrupted with planar portions between adjacent seating grooves 52.

Alternatively, the planar notched pattern 58 may instead have a V-shaped configuration which forms a series of V-shaped notches about the axis A. In other words, the V-shaped notches may be defined into the spindle 42 or the washer 44 at approximately 30 degrees to approximately 60 degrees relative to the axis A. In this embodiment, the planar notched pattern 58 may be uninterrupted or may be interrupted with planar portions between adjacent seating grooves 52. It is to be appreciated that this range of angles is only exemplary. The angle of the planar notched pattern could even fall outside of this range. Said differently, the angle could be more than 60 degrees relative to the axis A or less than 30 degrees relative to the axis A. The planar notched pattern 58 may even have a series of angles which define the seating groove 52. It is also to be appreciated that many geometries of the seating groove 52 are possible while still forming a planar notched pattern 58 about the axis A.

In certain embodiments, as shown in FIGS. 2B and 3B-6, the spindle 42, the washer 44, or both the spindle 42 and the washer 44 has an inner wall portion 60 disposed between the biasing member 46 and the shaft 36, with the inner wall portion 60 partially defining the seating groove 52 such that the biasing member 46 is radially free from enclosure by the spindle 42 or the washer 44. In particular, in the embodiment where the washer has the inner wall portion 60 partially defining the seating groove 52 such that the biasing member 46 is radially free from enclosure by the washer 44, the crest portion 50 of the biasing member 46 is disposed at least partially into the seating groove 52 and thus the crest portion 50 of the biasing member 46 is radially free from enclosure by the washer 44.

While only the washer 44 has been shown in FIGS. 2B and 3B-6 to have the inner wall portion 60 partially defining the seating groove 52 such that the biasing member 46 is radially free from enclosure by the washer 44, it is to be appreciated that the spindle 42 may also have the inner wall portion 60 partially defining the seating groove 52 such that the biasing member 46 is radially free from enclosure by the spindle 42.

In other embodiments, as shown in FIGS. 2A, 3A, and 3C-6, the spindle 42, the washer 44, or both the spindle 42 and the washer 44 has an outer wall portion 62 spaced from the inner wall portion 60 such that the biasing member 46 is disposed between the inner wall portion 60 and the outer wall portion 62, with the outer wall portion 62 partially defining the seating groove 52 such that the biasing member 46 is radially enclosed by the spindle 42 or the washer 44. In particular, in the embodiment where the spindle 42 has the outer wall portion 62 partially defining the seating groove 52 such that the biasing member 46 is radially enclosed by the spindle 42, the trough portion 48 of the biasing member 46 is disposed at least partially into the seating groove 52 and thus the trough portion 48 of the biasing member 46 is radially enclosed by the spindle 42.

While only the spindle 42 has been shown in FIGS. 2A, 3A, and 3C-6 to have the outer wall portion 62 partially defining the seating groove 52 such that the biasing member 46 is radially enclosed by the spindle 42, it is to be appreciated that the washer 44 may also have the outer wall portion 62 partially defining the seating groove 52 such that the biasing member 46 is radially enclosed by the washer 44.

It is also to be appreciated that the inner wall portion 60 and the outer wall portion 62 may both partially define the seating groove 52, as shown in FIGS. 2A, 3A, and 3C-6. More specifically, either the spindle 42 or the washer 44 may have both of the inner and outer wall portions 60, 62, or both the spindle 42 and the washer 44 may have both of the inner and outer wall portions 60, 62. Although not shown, the outer wall portion 62 also may partially define the seating groove 52 without any inner wall portion 60 partially defining the seating groove 52.

The outer wall portion 62 may advantageously prevent the biasing member 46, particularly the trough portion 48 or the crest portion 50 of the biasing member 46, from wear and fatigue caused by contact with exhaust gas at high temperatures. As such, the outer wall portion 62 prevents the biasing member 46 from premature failure. In turn, this further extends the life of the wastegate assembly 30 and further prevents the undesired NVH issues in the turbocharger 10.

The depth D of the seating groove 52 may be defined between 0.1 and 2 millimeters into the spindle 42 or the washer 44. This depth D is only exemplary. The depth D of the seating groove 52 could even fall outside of this range. In other words, the depth D also may be less than 0.1 millimeters or may be more than 2 millimeters. Factors which influence the depth D of the seating groove 52 include, but are not limited to, the size of the biasing member 46, particularly the size of the trough portion 48 and the crest portion 50, the size of the spindle 42, and the size of the washer 44.

The biasing member 46 has a thickness in the axial direction. In one embodiment, the depth D of the seating groove 52 is preferably defined into the spindle 42 or the washer 44 between one and two times the thickness of the biasing member 46. This relationship between the thickness of the biasing member 46 and the depth D of the seating groove 52 is only exemplary. The relationship between the thickness of the biasing member 46 and the depth D of the seating groove 52 could even all outside this range. In other words, the depth D of the seating groove 52 may be defined into the spindle 42 or the washer 44 less than one times the thickness of the biasing member 46 to ensure a gap between the spindle 42 and the washer 44. Alternatively, the depth D of the seating groove 52 may be defined into the spindle 42 or the washer 44 more than two times the thickness of the biasing member 46 to advantageously further prevent the biasing member 46, particularly the trough portion 48 or the crest portion 50 of the biasing member 46, from wear and fatigue caused by contact with exhaust gas at high temperatures.

In certain embodiments, as shown in FIGS. 2A, 3A, and 3C-6, the spindle 42 defines the seating groove 52 and the trough portion 48 of the biasing member 46 extends at least partially into the seating groove 52 to seat and prevent rotation of the biasing member 46. In these embodiments, the trough portion 48 of the biasing member 46 is mirrored by the seating groove 52 such that the trough portion 48 of the biasing member 46 aligns with the seating groove 52 for the trough portion 48 of the biasing member 46 to extend at least partially into the seating groove 52.

Figure 3A:
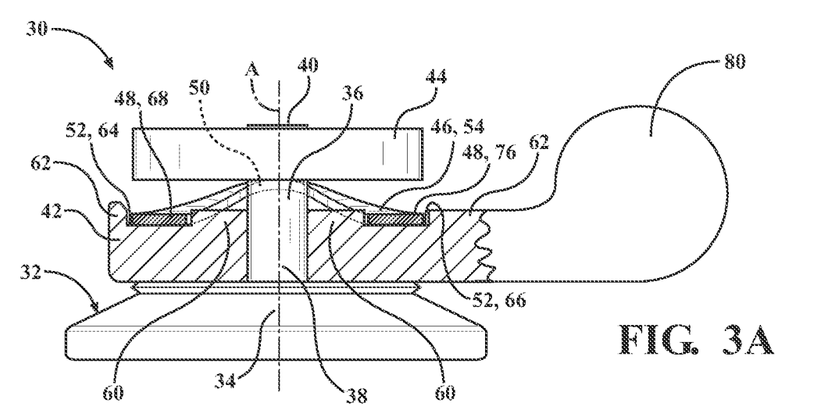
FIG. 3A is a partial cross-sectional view of the wastegate assembly, with the spindle defining a second seating groove and with the biasing member having a second trough portion that extends at least partially into the second seating groove.
Figure 3B:
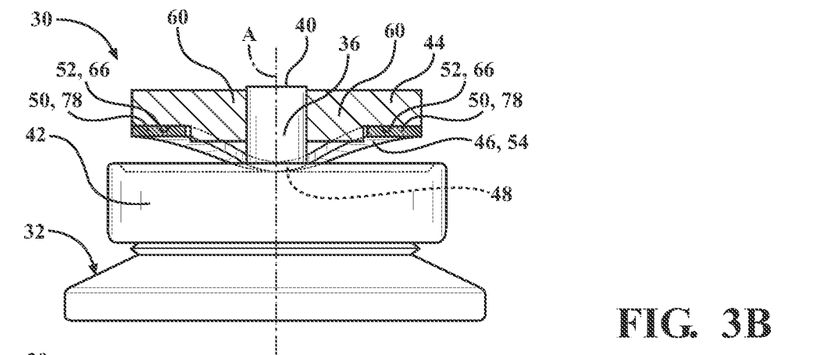
FIG. 3B is a partial cross-sectional view of the wastegate assembly, with the washer defining the second seating groove and with the biasing member having a second crest portion that extends at least partially into the second seating groove.
Figure 3C:
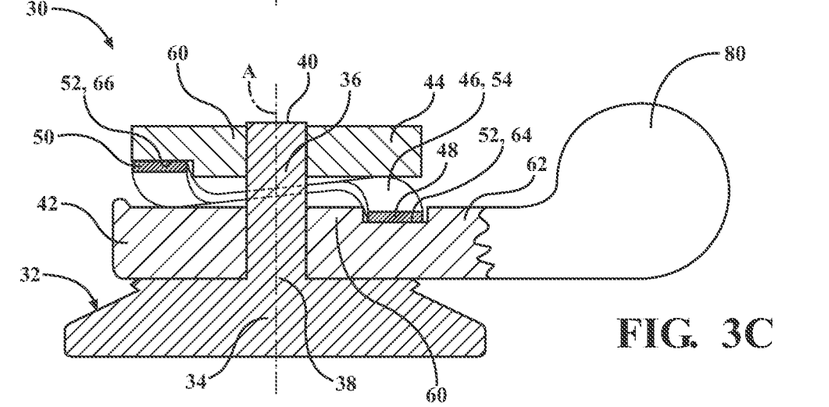
FIG. 3C is a partial cross-sectional view of the wastegate assembly, with the spindle defining the first seating groove, the washer defining the second seating groove, the trough portion of the biasing member extending at least partially into the first seating groove, the crest portion of the biasing member extending at least partially into the second seating groove, the washer having an inner wall portion, and the spindle having an outer wall portion.

In the embodiments where the seating groove 52 is defined by the spindle 42, the seating groove 52 may be defined to allow a limited amount of radial, circumferential, and axial play for the trough portion 48 of the biasing member 46 to seat at least partially in the seating groove 52. In other words, the seating groove 52 may have slightly larger dimensions than the trough portion 48 of the biasing member 46. These slightly larger dimensions advantageously lower required tolerances of the biasing member 46 and the seating groove 52.

Additionally, in the embodiments where the wastegate assembly 30 includes the seating groove 52 defined by the spindle 42 and the trough portion 48 of the biasing member 46 extends at least partially into the seating groove 52, the wastegate assembly 30 has increased rotational stiffness, particularly between the biasing member 46 and the spindle 42. This rotational stiffness resists high torque exerted on the wastegate assembly 30 during operation of the turbocharger 10. In particular, this rotational stiffness damps motion between the biasing member 46 and the spindle 42 of the wastegate assembly 30. Additionally, the rotational stiffness imparted to the wastegate assembly 30 when the biasing member 46 is disposed at least partially in the spindle 42 protects the biasing member 46 from wear, fatigue, and premature failure. In turn, this extends the life of the wastegate assembly 30 and prevents the undesired NVH issues in the turbocharger 10.

In other embodiments, as shown in FIGS. 2B and 3B-6, the washer 44 defines the seating groove 52 and the crest portion 50 of the biasing member 46 extends at least partially into the seating groove 52 to seat and prevent rotation of the biasing member 46. In these embodiments, the crest portion 50 of the biasing member 46 is mirrored by the seating groove 52 such that the crest portion 50 of the biasing member 46 aligns with the seating groove 52 for the crest portion 50 of the biasing member 46 to extend at least partially into the seating groove 52.

In the embodiments where the seating groove 52 is defined by the washer 44, the seating groove 52 may be defined to allow a limited amount of radial, circumferential, and axial play for the crest portion 50 of the biasing member 46 to seat at least partially in the seating groove 52. In other words, the seating groove 52 may have slightly larger dimensions than the crest portion 50 of the biasing member 46. These slightly larger dimensions advantageously lower required tolerances of the biasing member 46 and the seating groove 52.

Additionally, in the embodiments where the wastegate assembly 30 includes the seating groove 52 defined by the washer 44 and the crest portion 50 of the biasing member 46 extends at least partially into the seating groove 52, the wastegate assembly 30 has increased rotational stiffness, particularly between the biasing member 46 and the washer 44. This rotational stiffness resists high torque exerted on the wastegate assembly 30 during operation of the turbocharger 10. In particular, this rotational stiffness damps motion between the biasing member 46 and the washer 44 of the wastegate assembly 30. Additionally, the rotational stiffness imparted to the wastegate assembly 30 when the biasing member 46 is disposed at least partially in the washer 44 protects the biasing member 46 from wear, fatigue, and premature failure. In turn, this extends the life of the wastegate assembly 30 and prevents the undesired NVH issues in the turbocharger 10.

In certain embodiments, as shown in FIGS. 3A-3C, the seating groove 52 is further defined as a first seating groove 64, and either the spindle 42 or the washer 44 defines a second seating groove 66. In these embodiments, the biasing member 46 extends at least partially into the second seating groove 66 to seat and prevent rotation of the biasing member 46.

The first and second seating grooves 64, 66 may both be defined in the spindle 42. In this embodiment, as shown in FIG. 3A, the wastegate assembly 30 advantageously results in additional rotational stiffness between the biasing member 46 and the spindle 42. This additional rotational stiffness results from the biasing member 46 having two points of contact with the first and second seating grooves 64, 66 of the spindle 42. Additionally, the first and second seating grooves 64, 66 may be defined equally spaced circumferentially about the axis A, which advantageously results in more even, symmetric, and uniform rotational stiffness between the biasing member 46 and the spindle 42.

Alternatively, the first and second seating grooves 64, 66 may both be defined in the washer 44. In this embodiment, as shown in FIG. 3B, the wastegate assembly 30 advantageously results in additional rotational stiffness between the biasing member 46 and the washer 44. This additional rotational stiffness results from the biasing member 46 having two points of contact with the first and second seating grooves 64, 66 of the washer 44. Additionally, the first and second seating grooves 64, 66 may be defined equally spaced circumferentially about the axis A, which advantageously results in more even, symmetric, and uniform rotational stiffness between the biasing member 46 and the washer 44.

In one embodiment, as shown in FIG. 3C, the first seating groove 64 is defined by the spindle 42 and the second seating groove 66 is defined by the washer 44. In this embodiment, the trough portion 48 of the biasing member 46 extends at least partially into the first seating groove 64 and the crest portion 50 of the biasing member 46 extends at least partially into the second seating groove 66 to seat and prevent rotation of the biasing member 46 relative to both the spindle 42 and the washer 44. As such, the biasing member 46 disposed at least partially into the first and second seating grooves 64, 66 in the spindle 42 and the washer 44 imparts additional rotational stiffness to the wastegate assembly 30.

Figure 4A:
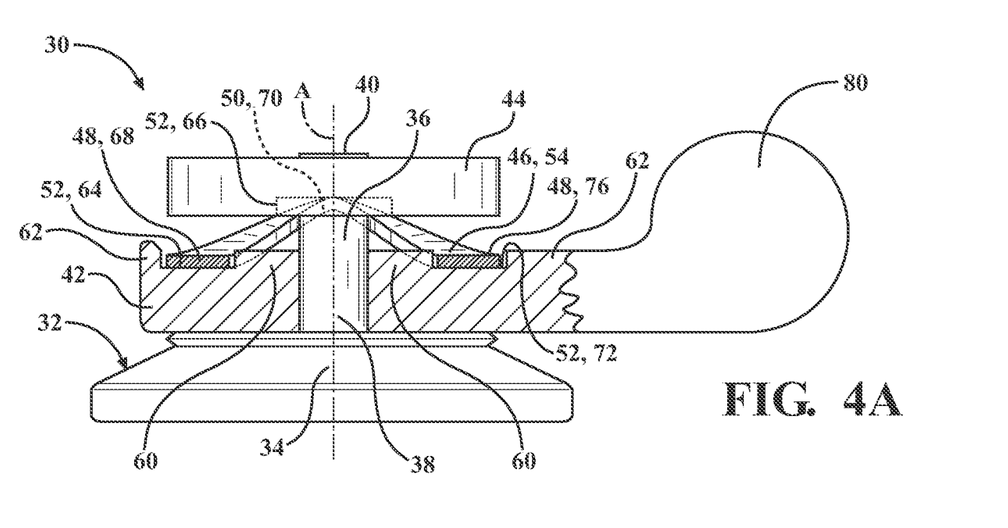
FIG. 4A is a partial cross-sectional view of the wastegate assembly, with the spindle defining first and second seating grooves, the washer defining third and fourth seating grooves, the biasing member having first and second trough portions extending at least partially into the first and second seating grooves, and the biasing member having first and second crest portions extending at least partially into the third and fourth seating grooves.
Figure 4B:
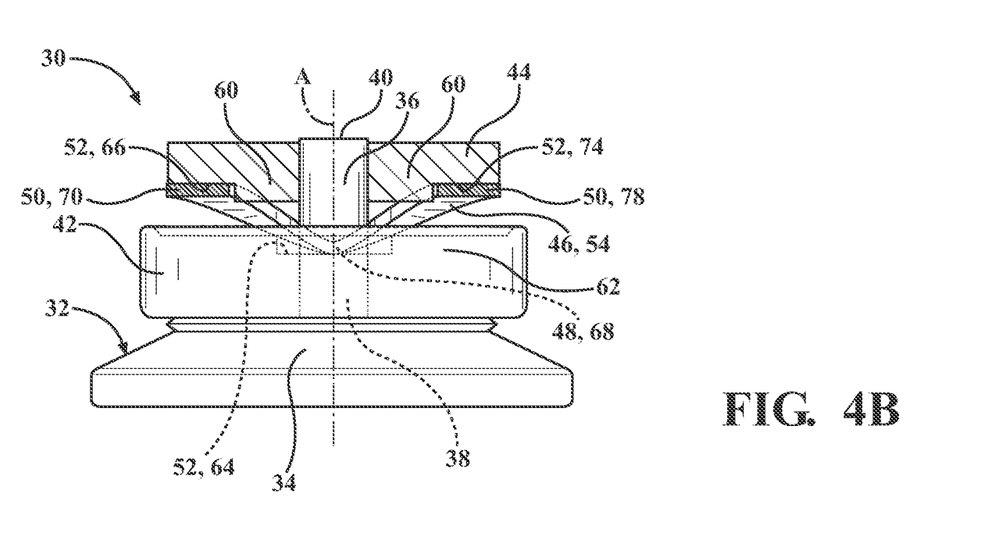
FIG. 4B is the wastegate assembly as shown in FIG. 4A rotated 90 degrees.

With reference to FIGS. 4A and 4B, the trough portion 48 may be further defined as a first trough portion 68 and the crest portion 50 may be further defined as a first crest portion 70. Additionally, the spindle 42 may define a third seating groove 72 and the washer 44 may define a fourth seating groove 74. In this embodiment, the biasing member 46 has a second trough portion 76 that extends at least partially into the third seating groove 72, and the biasing member 46 has a second crest portion 78 that extends at least partially into the fourth seating groove 74 to seat and prevent rotation of the biasing member 46.

In the embodiment with the first, second, third, and fourth seating grooves 64, 66, 72, 74, the wastegate assembly 30 has all of the benefits ascribed to the embodiment where the first and second seating grooves 64, 66 are defined in the spindle 42, the embodiment where the first and second seating grooves 64, 66 are defined in the washer 44, and the embodiment where the first seating groove 64 is defined in the spindle 42 and the second seating groove 66 is defined in the washer 44. In addition to these benefits, the first, second, third, and fourth seating grooves 64, 66, 72, 74 of the wastegate assembly 30 also have a synergistic effect upon the wastegate assembly 30. More specifically, the biasing member 46, the spindle 42, and the washer 44 advantageously result in more even, symmetric, and uniform rotational stiffness, seating, and damping of motion therebetween. As such, the biasing member 46 is protected from wear, fatigue, and premature failure. In turn, this further extends the life of the wastegate assembly 30 and further prevents the undesired NVH issues in the turbocharger 10.

The spindle 42 and the washer 44 may define more than four seating grooves. In these embodiments, the spindle 42 and the washer 44 may define a fifth, sixth, seventh, and/or eighth seating groove. In these embodiments, the biasing member may have a third and/or fourth trough portion extending toward the spindle 42 to further seat and prevent rotation of the biasing member 46. In these embodiments, the biasing member 46 may also have a third and/or fourth crest portion extending toward the washer 44 to further seat and prevent rotation of the biasing member 46. It is to be appreciated that the spindle 42 and the washer 44 may define any number of seating grooves 52 and the biasing member 46 may define any number of trough portions 48 and crest portions 50 while still remaining within the scope of the present invention.

The first and second trough portions 68, 76 of the biasing member 46 may be equally spaced circumferentially about the shaft 36 such that the first and second trough portions 68, 76 are symmetrically mirrored about the axis A. Similarly, the first and second crest portions 70, 78 of the biasing member 46 may be equally spaced circumferentially about the shaft 36 such that the first and second crest portions 70, 78 are symmetrically mirrored about the axis A. In the embodiments where the biasing member 46 defines the third and/or fourth trough portions, the third and/or fourth trough portions may also be equally spaced circumferentially about the shaft 36. Similarly, in the embodiments where the biasing member 46 defines the third and/or fourth crest portions, the third and/or fourth crest portions may also be equally spaced circumferentially about the shaft 36. When the trough and/or crest portions 48, 50 are equally spaced circumferentially about the shaft 36, the biasing member 46 imparts additional rotational stiffness to the wastegate assembly 30.

The spindle 42 may have a spindle arm 80 extending from the spindle 42 which is coupled to an actuator 82 for actuating the spindle 42 and moving the valve element 32 between the first and second positions. With reference to FIGS. 3A, 3B, and 4A-6, the trough and crest portions 48, 50 of the biasing member 46 and the seating grooves 52 defined by the spindle 42 and the washer 44 are shown consistently in the same orientation relative to the spindle arm 80 of the spindle 42. In other words, the seating grooves 52 defined by the spindle 42 and the washer 44 are shown consistently offset by the same angle relative to the spindle arm 80. In another embodiment, however, the orientation of the trough and crest portions 48, 50 of the biasing member 46 and the seating grooves 52 defined by the spindle 42 and the washer 44 may be rotated about the axis A relative to the spindle arm 80. As a non-limiting example, the orientation may be rotated approximately 45 degrees or approximately 90 degrees clockwise or counterclockwise relative to the spindle arm 80 and still retain the benefits of seating and preventing rotation of the biasing member 46.

It is to be appreciated that the various components of the wastegate assembly 30 and the turbocharger 10 are merely illustrative and may not be drawn to scale. The invention has been described in an illustrative manner, and it is to be understood that the terminology which has been used is intended to be in the nature of words of description rather than of limitation. Many modifications and variations of the present invention are possible in light of the above teachings, and the invention may be practiced otherwise than as specifically described.

What is claimed is:

1. A wastegate assembly for controlling flow of exhaust gas to a turbine housing interior of a turbocharger, said wastegate assembly comprising:
   a valve element having a valve body and a shaft extending away from said valve body, with said shaft extending along an axis between a first end and a second end spaced from said first end along said axis, and with said valve element moveable between a first position and a second position to control the flow of exhaust gas to the turbine housing interior of the turbocharger;

a spindle coupled to said shaft of said valve element for moving said valve element between said first and second positions;

a washer coupled to said shaft of said valve element and spaced from said spindle along said axis such that said spindle is disposed between said valve body and said washer for retaining said spindle to said shaft of said valve element; and a biasing member disposed between said spindle and said washer, with said biasing member having a trough portion extending toward said spindle and having a crest portion extending toward said washer;

wherein at least one of said spindle and said washer define a seating groove and said biasing member extends at least partially into said seating groove to seat and prevent rotation of said biasing member.

2. The wastegate assembly as set forth in claim 1, wherein said at least one of said spindle and said washer defines said seating groove in a continuous sinusoidal pattern about said axis.

3. The wastegate assembly as set forth in claim 1, wherein said at least one of said spindle and said washer defines said seating groove in a planar notched pattern about said axis.

4. The wastegate assembly as set forth in claim 1, wherein said at least one of said spindle and said washer has an inner wall portion disposed between said biasing member and said shaft, with said inner wall portion partially defining said seating groove such that said biasing member is radially free from enclosure by said at least one of said spindle and said washer.

5. The wastegate assembly as set forth in claim 4, wherein said at least one of said spindle and said washer has an outer wall portion spaced from said inner wall portion such that said biasing member is disposed between said inner wall portion and said outer wall portion, with said outer wall portion partially defining said seating groove such that said biasing member is radially enclosed by said at least one of said spindle and said washer.

6. The wastegate assembly as set forth in claim 1, wherein said spindle defines said seating groove and said trough portion of said biasing member extends at least partially into said seating groove to seat and prevent rotation of said biasing member.

7. The wastegate assembly as set forth in claim 1, wherein said washer defines said seating groove and said crest portion of said biasing member extends at least partially into said seating groove to seat and prevent rotation of said biasing member.

8. The wastegate assembly as set forth in claim 1, wherein said seating groove is further defined as a first seating groove, wherein said at least one of said spindle and said washer defines a second seating groove, and wherein said biasing member extends at least partially into said second seating groove to seat and prevent rotation of said biasing member.

9. The wastegate assembly as set forth in claim 8, wherein said first seating groove is defined by said spindle and said second seating groove is defined by said washer, and wherein said trough portion of said biasing member extends at least partially into said first seating groove, and said crest portion of said biasing member extends at least partially into said second seating groove to seat and prevent rotation of said biasing member.

10. The wastegate assembly as set forth in claim 9, wherein said trough portion is further defined as a first trough portion and said crest portion is further defined as a first crest portion, wherein said spindle defines a third seating groove and said washer defines a fourth seating groove, and wherein said biasing member has a second trough portion that extends at least partially into said third seating groove and said biasing member has a second crest portion that extends at least partially into said fourth seating groove to seat and prevent rotation of said biasing member.

11. A turbocharger for receiving exhaust gas from an internal combustion engine and for delivering compressed air to the internal combustion engine, said turbocharger comprising:

a turbine housing comprising:
an interior surface defining a turbine housing interior, said interior surface extending between:
a turbine housing inlet defined at one end of said interior surface and in fluid communication with the internal combustion engine and said turbine housing interior for delivering exhaust gas from the internal combustion engine to said turbine housing interior; and
a turbine housing outlet defined at an opposite end of said interior surface and in fluid communication with said turbine housing interior for discharging exhaust gas from said turbine housing interior; and
a wastegate duct disposed downstream of the turbine housing inlet and defining a wastegate channel in fluid communication with said turbine housing inlet for discharging exhaust gas from said turbine housing inlet by bypassing said turbine housing interior;

a valve seat disposed about said wastegate channel at a channel outlet of said wastegate channel; and a wastegate assembly for controlling flow of exhaust gas to said turbine housing interior, said wastegate assembly comprising:
a valve element engageable with said valve seat, with said valve element having a valve body and a shaft extending away from said valve body along an axis between a first end and a second end spaced from said first end along said axis, and with said valve element moveable between a first position where said valve body is engaged with said valve seat for preventing flow of exhaust gas from said turbine housing inlet from bypassing said turbine housing interior, and a second position where said valve body is disengaged with said valve seat for allowing flow of exhaust gas from said turbine housing inlet to bypass said turbine housing interior;
a spindle coupled to said shaft of said valve element for moving said valve element between said first and second positions;
a washer coupled to said shaft of said valve element and spaced from said spindle along said axis such that said spindle is disposed between said valve body and said washer for retaining said spindle to said shaft of said valve element; and
a biasing member disposed between said spindle and said washer, with said biasing member having a trough portion extending toward said spindle and having a crest portion extending toward said washer;
wherein at least one of said spindle and said washer define a seating groove and said biasing member extends at least partially into said seating groove to seat and prevent rotation of said biasing member.

12. The turbocharger as set forth in claim 11, wherein said at least one of said spindle and said washer defines said seating groove in a continuous sinusoidal pattern about said axis.

13. The turbocharger as set forth in claim 11, wherein said at least one of said spindle and said washer defines said seating groove in a planar notched pattern about said axis.

14. The turbocharger as set forth in claim 11, wherein said at least one of said spindle and said washer has an inner wall portion disposed between said biasing member and said shaft, with said inner wall portion partially defining said seating groove such that said biasing member is radially free from enclosure by said at least one of said spindle and said washer.

15. The turbocharger as set forth in claim 14, wherein said at least one of said spindle and said washer has an outer wall portion spaced from said inner wall portion such that said biasing member is disposed between said inner wall portion and said outer wall portion, with said outer wall portion partially defining said seating groove such that said biasing member is radially enclosed by said at least one of said spindle and said washer.

16. The turbocharger as set forth in claim 11, wherein said spindle defines said seating groove and said trough portion of said biasing member extends at least partially into said seating groove to seat and prevent rotation of said biasing member.

17. The turbocharger as set forth in claim 11, wherein said washer defines said seating groove and said crest portion of said biasing member extends at least partially into said seating groove to seat and prevent rotation of said biasing member.

18. The turbocharger as set forth in claim 11, wherein said seating groove is further defined as a first seating groove, wherein said at least one of said spindle and said washer defines a second seating groove, and wherein said biasing member extends at least partially into said second seating groove to seat and prevent rotation of said biasing member.

19. The turbocharger as set forth in claim 18, wherein said first seating groove is defined by said spindle and said second seating groove is defined by said washer, and wherein said trough portion of said biasing member extends at least partially into said first seating groove and said crest portion of said biasing member extends at least partially into said second seating groove to seat and prevent rotation of said biasing member.

20. The turbocharger as set forth in claim 19, wherein said trough portion is further defined as a first trough portion and said crest portion is further defined as a first crest portion, wherein said spindle defines a third seating groove and said washer defines a fourth seating groove, and wherein said biasing member has a second trough portion that extends at least partially into said third seating groove, and said biasing member has a second crest portion that extends at least partially into said fourth seating groove to seat and prevent rotation of said biasing member.

\* \* \* \* \*